US012792148B2

(12) United States Patent
Lee et al.

(10) Patent No.: US 12,792,148 B2
(45) Date of Patent: Nov. 10, 2026

(54) METHOD AND APPARATUS FOR PRESENTING VISUAL FEEDBACK

(71) Applicants: HYUNDAI MOTOR COMPANY, Seoul (KR); KIA CORPORATION, Seoul (KR)

(72) Inventors: Taejun Lee, Hwaseong-si (KR); Seungkyu Nam, Hwaseong-si (KR); Hoseung Cha, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 81 days.

(21) Appl. No.: 18/916,061

(22) Filed: Oct. 15, 2024

(65) Prior Publication Data

US 2025/0348145 A1 Nov. 13, 2025

(30) Foreign Application Priority Data

May 13, 2024 (KR) ........................ 10-2024-0062759

(51) Int. Cl.
*G06F 3/01* (2006.01)
*G06F 18/21* (2023.01)
*G06F 18/2131* (2023.01)

(52) U.S. Cl.
CPC .......... *G06F 3/015* (2013.01); *G06F 18/2131* (2023.01); *G06F 18/2178* (2023.01)

(58) Field of Classification Search
None
See application file for complete search history.

(56) References Cited

U.S. PATENT DOCUMENTS

| | | | | |
|---|---|---|---|---|
| 8,786,546 | B1 * | 7/2014 | Bendickson | G06F 3/015 345/8 |
| 9,773,332 | B2 * | 9/2017 | Urbach | G02B 27/017 |
| 9,864,431 | B2 * | 1/2018 | Keskin | G06F 3/015 |
| 11,520,405 | B1 | 12/2022 | Nam | |

(Continued)

FOREIGN PATENT DOCUMENTS

| | | | | |
|---|---|---|---|---|
| CN | 109828664 | A | * | 5/2019 |
| KR | 20230007139 | A | | 1/2023 |

(Continued)

OTHER PUBLICATIONS

Erwei Yin et al., A dynamically optimized SSVEP brain-computer interface (BCI) speller, IEEE Transactions on Biomedical Engineering, 2013, DOI 10.1109/TBME.2014.2320948, 10pp.

(Continued)

*Primary Examiner* — Fekadeselassie Girma
(74) *Attorney, Agent, or Firm* — Lempia Summerfield Katz LLC

(57) ABSTRACT

A method for presenting visual feedback includes receiving a steady-state visual evoked potential (SSVEP) signal extracted through an electroencephalogram (EEG) analysis of a user gazing at a visual stimulus of a specific frequency. The method also includes classifying the visual stimulus and generate a classification result based on the SSVEP signal. The method additionally includes disposing, on the visual stimulus, a visual feedback having a same frequency as the visual stimulus. The method further includes reflecting the classification result in the visual feedback in real time.

18 Claims, 7 Drawing Sheets

(56) References Cited

U.S. PATENT DOCUMENTS

| | | | | |
|---|---|---|---|---|
| 11,809,629 | B1 * | 11/2023 | Segil | G06F 3/016 |
| 12,182,328 | B2 * | 12/2024 | Segil | G06F 3/014 |
| 12,422,927 | B2 * | 9/2025 | Barascud | G06F 3/015 |
| 12,447,340 | B2 * | 10/2025 | Hagh Gooie | A61N 1/0541 |
| 12,494,015 | B2 * | 12/2025 | Bao | G06F 3/012 |
| 2009/0264787 | A1 * | 10/2009 | Lee | G06F 3/015 600/544 |
| 2010/0234752 | A1 * | 9/2010 | Sullivan | A61B 5/165 600/544 |
| 2021/0169417 | A1 * | 6/2021 | Burton | A61B 5/02055 |
| 2022/0054830 | A1 * | 2/2022 | Gooie | A61N 1/36003 |
| 2025/0348145 | A1 * | 11/2025 | Lee | G06F 3/015 |

FOREIGN PATENT DOCUMENTS

| | | | | |
|---|---|---|---|---|
| KR | 20230075079 A | | 5/2023 | |
| WO | WO-2026005966 A1 | * | 1/2026 | G06F 3/015 |

OTHER PUBLICATIONS

Guangyu Bin et al., An online multi-channel SSVEP-based brain-computer interface using a canonical correlation analysis method, Journal of Neural Engineering 6 (2009) 046002, doi:10.1088/1741-2560/6/4/046002, 7pp.

H. Cecotti, Adaptive Time Segment Analysis for Steady-State Visual Evoked Potential Based Brain-Computer Interfaces, IEEE Transactions on Neural Systems and Rehabilitation Engineering, vol. 28, No. 3, Mar. 2020, 9pp.

Jacobo Fernandez-Vargas et al., Assisted closed-loop optimization of SSVEP-BCI efficiency, Frontiers in Neural Circuits, Feb. 2013, vol. 7, Article 27, doi: 10.3389/fncir.2013.00027, 15 pp.

Jing Jiang et al., Incorporation of dynamic stopping strategy into the high-speed SSVEP-based BCIs, Journal of Neural Engineering, 2018, https://doi.org/10.1088/1741-2552/aac605, 21pp.

Mihaly Benda et al., Comparison of Different Visual Feedback Methods for SSVEP-Based BCIs, Brain Sciences 2020, 10, 240; doi:10.3390/brainsci10040240, 13pp.

Taejun Lee et al., Adaptive Window Method Based on FBCCA for Optimal SSVEP Recognition, IEEE Transactions on Neural Systems and Rehabilitation Engineering, vol. 31, 2023, 9pp.

* cited by examiner

METHOD AND APPARATUS FOR PRESENTING VISUAL FEEDBACK

CROSS-REFERENCE TO RELATED APPLICATION

This application claims priority to and the benefit of Korean Patent Application No. 10-2024-0062759, filed on May 13, 2024, the entire contents of which are hereby incorporated herein by reference.

TECHNICAL FIELD

The present disclosure relates to a method and apparatus for presenting a visual feedback.

BACKGROUND

A steady-state visual evoked potential (SSVEP) is an electroencephalogram potential generated when gazing at a visual stimulus flickering at a particular frequency. SSVEP may be extracted through an electroencephalogram (EEG) analysis measured near the occipital lobe.

Since a particular frequency of the gazed visual stimulus may be detected from the electroencephalogram signal, electroencephalogram analysis may be used to identify the visual stimulus at which the user gazed. Accordingly, it may be utilized in developing various brain-computer interfaces (BCIs).

Despite the development of SSVEP-based BCI algorithms, there is still a problem in which BCI performance is greatly affected by the user fatigue, concentration, and attitude. In addition, in order to detect SSVEP signals with constant performance, a fixed SSVEP stimulation time (fixed time window) is used through prior offline analysis, and the results of the stimulus at which the user gazed may be known after the stimulation ends.

For SSVEP stimulation, there is variability due to the way each person looks at the stimulus, and as a result, there is a problem of difficulty in looking at the way they look.

SUMMARY

Embodiments of the present disclosure provide technology that allows users to become more immersed in a BCI system and improve performance accordingly, by allowing the users to check real-time electroencephalogram reaction while the SSVEP-inducing visual stimulus is being presented.

Embodiments of the present disclosure provide a method and apparatus for presenting a visual feedback capable of intuitively perceiving at which visual stimulus the user gazed by presenting, in a visual stimulus, a visual feedback reacting to the SSVEP signal generated when the user gazes at the visual stimulus in real time, and improving the detection performance by strengthening the gazing concentration of the user.

According to an embodiment, a method for presenting visual feedback is provided. The method includes receiving a steady-state visual evoked potential (SSVEP) signal extracted through an electroencephalogram (EEG) analysis of a user gazing at a visual stimulus of a specific frequency. The method also includes classifying the visual stimulus to generate a classification result based on the SSVEP signal. The method additionally includes disposing, on the visual stimulus, a visual feedback having a same frequency as the visual stimulus. The method further includes reflecting the classification result in the visual feedback in real time.

Reflecting the classification result in the visual feedback in real time may include varying a shape of a first visual feedback disposed in a first visual stimulus classified from among a plurality of visual stimuli in each of which the visual feedback is disposed according to the classification result to a first shape, and varying a shape of a second visual feedback disposed in a second visual stimulus that is not classified to a second shape.

Reflecting the classification result in the visual feedback in real time may include periodically collecting the classification result at every preset time point within a maximum window length, calculating a count value with respect to the visual stimulus based on the classification result collected at every time point, and varying a shape of the visual feedback in real time based on the calculated count value.

Collecting the classification result may include, when a length from a time point at which the visual stimulus first flickers to a current time point is greater than the maximum window length, collecting the classification result as much as the maximum window length based on the current time point.

The count value may have a maximum value and a minimum value, and the calculating the count value with respect to the visual stimulus may include setting the count value of an initial time point at which the visual stimulus is presented as an arbitrary the maximum value.

Calculating the count value with respect to the visual stimulus may further include, when presenting of the visual stimulus is started, initializing the count value of every visual stimulus at the initial time point as the maximum value.

Calculating the count value with respect to the visual stimulus may include, when the classification results of a first time point and a second time point that are contiguous are compared and found to be the same as a first visual stimulus, determining the count value of the second time point as a value obtained by subtracting a specific value from the count value of the first time point, with respect to a first visual stimulus that is classified, and determining the count value of the second time point as a value obtained by adding the specific value to the count value of the first time point, with respect to a second visual stimulus that is not classified.

Calculating the count value with respect to the visual stimulus may further include, when the first visual stimulus is classified at the first time point, and the second visual stimulus is classified at the second time point, maintaining the count value of the second time point to be the same value as the count value of the first time point, with respect to the second visual stimulus, and determining the count value of the second time point as a value obtained by adding the specific value to the count value of the first time point, with respect to the first visual stimulus.

The value obtained by adding the specific value to the count value may be smaller than or equal to a maximum value of the count value, and the value obtained by subtracting the specific value from the count value is greater than or equal to a minimum value of the count value.

The shape of the visual feedback has a first shape when the count value is the maximum value, and has a second shape when the count value may be the minimum value, and the varying the shape of the visual feedback in real time may include gradually varying the shape of the visual feedback between the first shape and the second shape at every time point in response to the calculated count value.

According to another embodiment, an apparatus for presenting visual feedback is provided. The apparatus includes a signal receiver configured to receive a steady-state visual evoked potential (SSVEP) signal extracted through an electroencephalogram (EEG) analysis of the user gazing a visual stimulus of a specific frequency. The apparatus also includes a signal processor configured to classify the visual stimulus and generate a classification result based on a SSVEP signal. The apparatus additionally includes a visual feedback reflector configured to dispose, on the visual stimulus, a visual feedback having a same frequency as the visual stimulus, and reflect the classification result in the visual feedback in real time.

The visual feedback reflector may be configured to vary a shape of a first visual feedback disposed in a first visual stimulus classified from among a plurality of visual stimuli in each of which the visual feedback is disposed according to the classification result to a first shape, and vary a shape of a second visual feedback disposed in a second visual stimulus that is not classified to a second shape.

The visual feedback reflector may be configured to periodically collect the classification result at every preset time point within a maximum window length, calculate a count value with respect to the visual stimulus based on the classification result collected at every time point, and vary a shape of the visual feedback in real time based on the calculated count value.

When a length from a time point at which the visual stimulus first flickers to a current time point is greater than the maximum window length, the visual feedback reflector may be configured to collect the classification result as much as the maximum window length based on the current time point.

The count value may have a maximum value and a minimum value, and the visual feedback reflector may be configured to set the count value of an initial time point at which the visual stimulus is presented as an arbitrary the maximum value.

When presenting of the visual stimulus is started, the visual feedback reflector may be configured to initialize the count value of every visual stimulus at the initial time point as the maximum value.

When the classification results of a first time point and a second time point that are contiguous are compared and found to be the same as a first visual stimulus, the visual feedback reflector may be configured to, determine the count value of the second time point as a value obtained by subtracting a specific value from the count value of the first time point, with respect to a first visual stimulus that is classified, and determine the count value of the second time point as a value obtained by adding the specific value to the count value of the first time point, with respect to a second visual stimulus that is not classified.

When the classification result of the first time point is the first visual stimulus and the classification result of the second time point is the second visual stimulus, providing a difference, the visual feedback reflector may be configured to, maintain the count value of the second time point to be the same value as the count value of the first time point, with respect to the second visual stimulus, and determine the count value of the second time point as the value obtained by adding the specific value to the count value of the first time point, with respect to the first visual stimulus.

The value obtained by adding the specific value to the count value may be smaller than or equal to a maximum value of the count value, and the value obtained by subtracting the specific value from the count value is greater than or equal to a minimum value of the count value.

The shape of the visual feedback may have a first shape when the count value is the maximum value, and has a second shape when it is the minimum value, and the visual feedback reflector may be configured to gradually vary the shape of the visual feedback between the first shape and the second shape at every time point, in response to the calculated count value.

A method and apparatus for presenting a visual feedback according to embodiments may be capable of intuitively perceiving which visual stimulus the user gazed by presenting a visual feedback reacting to the SSVEP signal generated when the user gazes a visual stimulus in real time in the visual stimulus, and improving the detection performance by strengthening the gazing concentration of the user.

DETAILED DESCRIPTION

Figure 1:
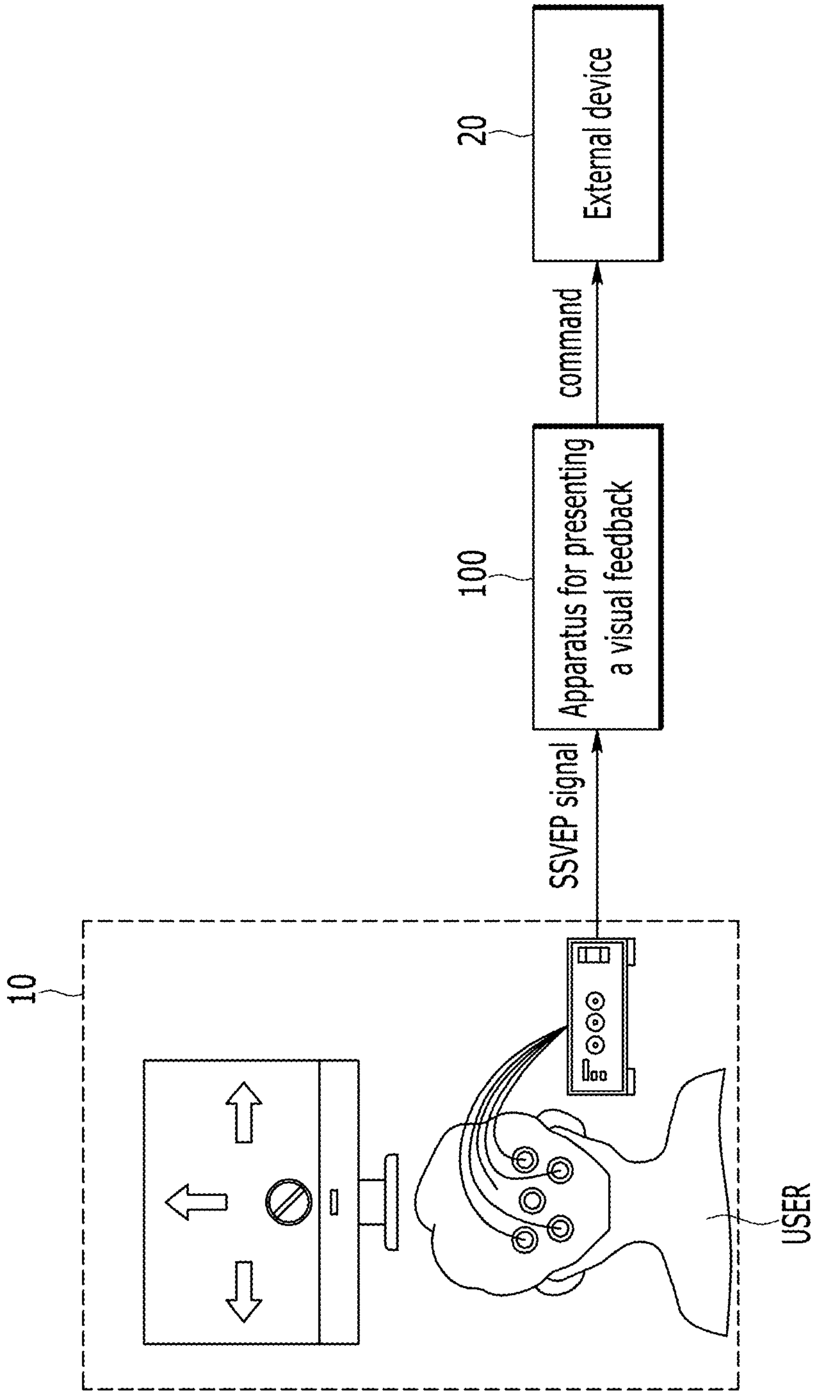
FIG. 1 schematically shows a SSVEP-based BCI system according to an embodiment.

Embodiments of the present disclosure are described in more detail hereinafter with reference to the accompanying drawings to enable a person of ordinary skill in the art to easily practice the embodiments. As those having ordinary skill in the art should realize, the described embodiments may be modified in various different ways, all without departing from the spirit or scope of the present disclosure. In order to clarify the present disclosure, parts that are not related to the description have been omitted, and the same elements or equivalents are referred to with the same reference numerals throughout the specification.

In addition, unless explicitly described to the contrary, the words such as "comprise" or "include" and variations such as "comprises," "comprising," "includes," or "including" should be understood to imply the inclusion of stated elements but not the exclusion of any other elements. Terms including an ordinary number, such as first and second, are used for describing various constituent elements, but the constituent elements are not limited by the terms. The terms are only used to differentiate one component from other components.

In addition, the terms "unit", "part" or "portion", "-er", and "module" in the specification refer to a unit that processes at least one function or operation, which may be implemented by hardware, software, or a combination of hardware and software.

When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described with reference to the accompanying drawings.

FIG. 1 schematically shows a SSVEP-based brain-computer interface (BCI) system according to an embodiment.

Referring to FIG. 1, a BCI system according to an embodiment may include an apparatus 100 for presenting a visual feedback, a steady-state visual evoked potential (SSVEP) generator 10, and external devices 20.

According to an embodiment of the present disclosure, the apparatus 100 for presenting a visual feedback may classify the visual stimulus at which the user gazed based on steady-state visual evoked potential (SSVEP), and may reflect in real time a classification result to the visual feedback disposed in the classified visual stimulus, such that the visual stimulus at which the user gazed may be immediately identified.

Here, the steady-state visual evoked potential (SSVEP) is an electroencephalogram potential generated when gazing at a visual stimulus flickering at a particular frequency. SSVEP may be extracted through an electroencephalogram (EEG) analysis measured near the occipital lobe.

Since a particular frequency of the gazed visual stimulus may be detected from the electroencephalogram signal, the steady-state visual evoked potential (SSVEP) may be identified through electroencephalogram analysis of which visual stimulus was gazed at by the user.

Therefore, the SSVEP may be utilized in developing various brain-computer interfaces (BCIs). The SSVEP may be referred to as an SSVEP signal.

The apparatus 100 for presenting a visual stimulus according to an embodiment may include a visual feedback disposed on a visual stimulus gazed at by the user. The apparatus 100 may react in real time to the SSVEP signal to provide real-time feedback to the user such that the visual stimulus gazed at by the user may be detected more rapidly and accurately.

A SSVEP generator 10 may provide the user with visual stimulation corresponding to a control command with respect to the external device 20, and may induce the user to produce an electroencephalogram (EEG) signal including an electroencephalogram corresponding to the visual stimulus.

For example, when the user gazes at an arrow in the forward direction, an electroencephalogram corresponding to the forward direction is included in the EEG signal of the user. Therefore, the apparatus 100 may detect electroencephalogram corresponding to the arrow of the forward direction from the EEG signal of the user. The SSVEP generator 10 may transfer the EEG signal to the apparatus 100 for presenting a visual feedback.

The external devices 20 may be connected to the apparatus 100 through a network. The external devices 20 may communicate with the apparatus 100 and be controlled according to the command received from the apparatus 100 for presenting a visual feedback.

For example, the external device 20 may include a personal mobility device, such as a wheelchair, an exoskeleton, or the like.

Figure 2:
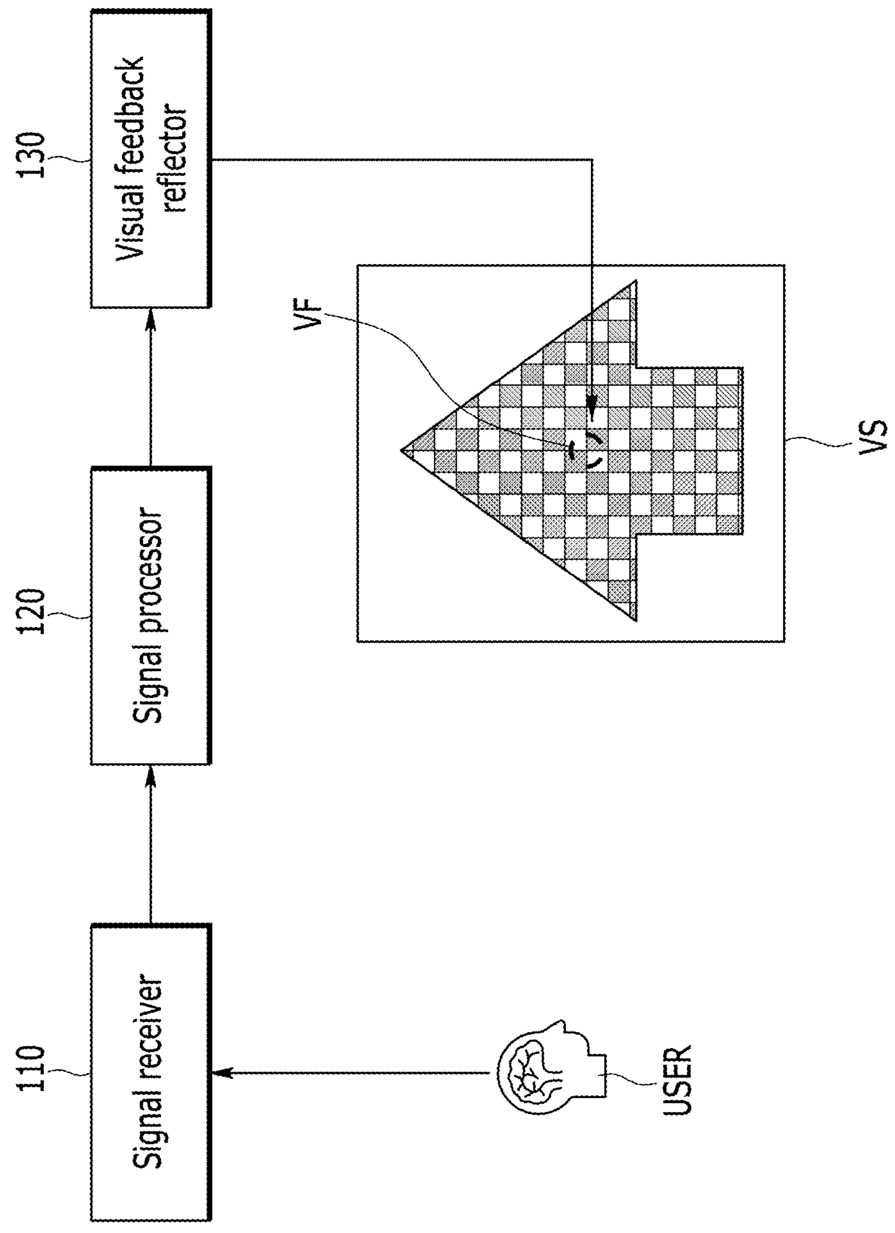
FIG. 2 is a block diagram of an apparatus for presenting a visual feedback according to an embodiment.

FIG. 2 is a block diagram of an apparatus for presenting the visual feedback according to an embodiment.

Referring to FIG. 2, the apparatus 100 for presenting a visual feedback may include a signal receiver 110, a signal processor 120, and a visual feedback reflector 130.

The signal receiver 110 may receive a steady-state visual evoked potential (SSVEP) signal extracted through the electroencephalogram (EEG) analysis of the user gazing at a visual stimulus of the specific frequency.

The visual stimulus STI may be an image that flickers according to the particular frequency. The visual stimulus STI may be a checkerboard image repeatedly inversed according to the particular frequency.

For example, the signal receiver 110 may receive the SSVEP signal or the SSVEP signal extracted from the electroencephalogram signal of the user gazing at the visual stimulus VS including an image flickering 10 times per 1 second, i.e, with a frequency of 10 Hz.

The signal processor 120 may classify the visual stimulus based on the SSVEP signal and may generate the classification result.

The signal processor 120 may classify the visual stimulus VS based on the received SSVEP signal. The signal processor 120 may classify the visual stimulus gazed at by the user from another visual stimulus based on the SSVEP signal.

The signal processor 120 may extract a feature of the SSVEP signal received from the signal receiver 110 and may classify the visual stimulus VS based on the extracted feature.

The signal processor 120 may extract the feature of the SSVEP signal. Feature extraction is the process of extracting important information from electroencephalogram signals. The most important feature in the SSVEP signal may the frequency of the electroencephalogram.

For example, the signal processor 120 may extract the frequency component from the electroencephalogram signal by using Fourier transform or wavelet transform, or the like.

The signal processor 120 may identify to which visual stimulus the user has reacted to, based on magnitude of power of each frequency component.

The signal processor 120 may classify the visual stimulus VS based on the extracted feature. Classification is the process of allocating electroencephalogram signals to a specific class or category using the extracted features.

For example, when the user concentrates on a particular visual stimulus, an electroencephalogram response corresponding to the frequency of the visual stimulus may be generated, and the signal processor 120 may determine, through the classification, which stimulus the electroencephalogram signal was in response to.

The signal processor 120 may classify the visual stimulus VS through a classification model. For example, the signal processor 120 may use the filter bank canonical correlation analysis (FBCCA) and/or various other classification models used for SSVEP classification.

In an embodiment, the classification algorithm may be based on machine-learning techniques. For example, the signal processor 120 may classify the visual stimulus by using support vector machine (SVM), K-nearest neighbor (K-NN), linear determination analysis (LDA), or the like.

The visual feedback reflector 130 may dispose a visual feedback VF, that has the same frequency as the visual stimulus VS, on the visual stimulus VS.

The visual feedback reflector 130 may reflect the classification result in the visual feedback VF in real time.

The visual feedback reflector 130 may dispose the visual feedback VF having a specific shape on the visual stimulus VS. The visual feedback reflector 130 may dispose the visual feedback VF at a center of the visual stimulus VS.

The visual feedback VF may guide the user's gaze and improve the gazing concentration of the user. The shape, pattern and color of the visual feedback VF is not particularly limited but may be freely set.

In an embodiment, the visual feedback VF may have the same frequency as the particular frequency that the visual stimulus STI gazed at by the user has. Accordingly, the visual feedback VF may flicker at the same frequency as the visual stimulus VS. The visual feedback VF may thus be synchronized with the frequency of the visual stimulus VS gazed at by the user, and may strengthen the frequency stimulus transferred to the user.

The visual feedback reflector 130 may vary a shape of a first visual feedback disposed in a first visual stimulus classified according to the classification result to a first shape from among a plurality of visual stimuli VS in each of which the visual feedback VF is disposed. The visual feedback reflector 130 may also vary a shape of a second visual feedback disposed in a second visual stimulus that is not classified to a second shape.

The visual feedback reflector 130 may periodically collect the classification result, at preset time points within a maximum window length.

When a length from a time point at which the visual stimulus VS first flickers to a current time point is greater than the maximum window length, the visual feedback reflector 130 may collect the classification result as much as the maximum window length based on the current time point.

The visual feedback reflector 130 may calculate a count value with respect to the visual stimulus VS based on the classification result collected at every time point.

The count value may have a maximum value and a minimum value. The visual feedback reflector 130 may set the count value of an initial time point at which the visual stimulus is presented as an arbitrary maximum value.

When presenting of the visual stimulus is started, the visual feedback reflector 130 may initialize count of every visual stimulus at the initial time point as the maximum value.

The visual feedback reflector 130 may vary a shape of the visual feedback VF in real time based on the calculated count value.

When the classification results of a first time point and a second time point that are contiguous are compared and found to be the same as the first visual stimulus, with respect to a first visual stimulus that is classified, the visual feedback reflector 130 may determine a value obtained by subtracting a specific value from the count value of the first time point as the count value with respect to the first visual stimulus of the second time point.

When the classification results are the same as the first visual stimulus, with respect to the second visual stimulus that is not classified, the visual feedback reflector 130 may determine a value obtained by adding the specific value to the count value of the first time point as the count value with respect to the second visual stimulus of the second time point.

When the classification result of the first time point is the first visual stimulus and the classification result of the second time point is the second visual stimulus that is different from that of the first time point, the visual feedback reflector 130 may maintain the count value of the second time point to be the same value as the count value of the first time point, with respect to the second visual stimulus.

When the classification result of the first time point is the first visual stimulus and the classification result of the second time point is the second visual stimulus that is different from that of the first time point, the visual feedback reflector 130 may determine the count value of the second time point as a value obtained by adding the specific value to the count value of the first time point, with respect to the first visual stimulus.

Here, a value obtained by adding the specific value to the count value may be smaller than or equal to the maximum value of the count value, and the value obtained by subtracting the specific value from the count value may be greater than or equal to the minimum value of the count value. The count value may thus vary between the maximum value and the minimum value.

In an embodiment, the visual feedback VF may have the first shape when the count value is the maximum value, and may have the second shape when it is the minimum value.

The visual feedback reflector 130 may gradually vary the shape of the visual feedback VF between the first shape and the second shape at every every time point in response to the calculated count value.

Figure 3:
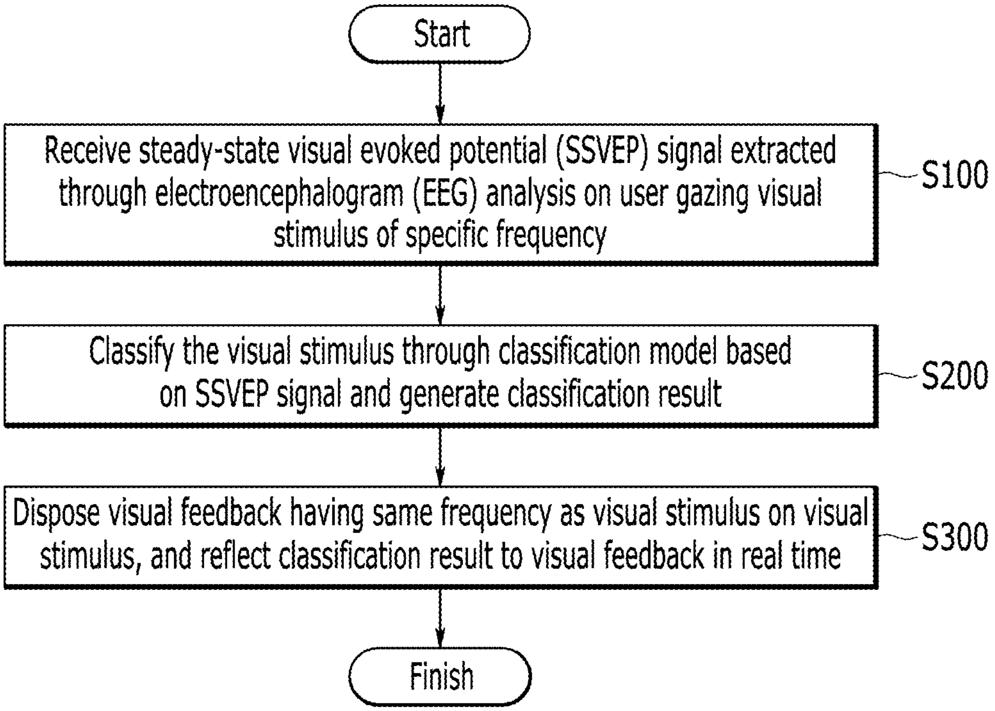
FIG. 3 is a flowchart of a method for presenting a visual feedback according to an embodiment.

FIG. 3 is a flowchart of a method for presenting the visual feedback according to an embodiment. The method for presenting the visual feedback of FIG. 3 may be performed through the apparatus 100 for presenting a visual feedback.

In FIG. 3, at a step or operation S100, the apparatus 100 may receive the steady-state visual evoked potential (SSVEP) signal extracted through the electroencephalogram (EEG) analysis of the user gazing at a visual stimulus of a specific frequency.

The apparatus 100 may receive the SSVEP signal through electroencephalogram analysis of the user gazing the visual stimulus and the visual feedback disposed on the visual stimulus.

At a step or operation S200, the apparatus 100 may classify the visual stimulus through the classification model based on the SSVEP signal and may generate a classification result.

The apparatus 100 may generate the classification result by using various classification models used for the SSVEP classification including the filter bank canonical correlation analysis (FBCCA).

At a step or operation S300, the apparatus 100 may dispose the visual feedback, that has the same frequency as the visual stimulus, on the visual stimulus, and may reflect the classification result in the visual feedback in real time.

The apparatus 100 may vary the shape of the first visual feedback disposed in the first visual stimulus classified according to the classification result from among the plurality of visual stimuli in each of which the visual feedback is disposed to the first shape. The apparatus 100 may also vary the shape of the second visual feedback disposed in the second visual stimulus that is not classified to the second shape.

The apparatus 100 may periodically collect the classification result, at preset time points within the maximum window length.

The apparatus 100 may calculate the count value with respect to the visual stimulus based on the classification result collected at every time point. The count value may have the maximum value the minimum value. The maximum value and the minimum value may be a preset arbitrary value.

The apparatus 100 may vary the shape of the visual feedback in real time based on the calculated count value.

For example, the apparatus 100 may vary the shape of the visual feedback to the first shape when the count value is the maximum value, and may vary it to the second shape when it is the minimum value.

At every time point, the apparatus 100 may increase the count value with respect to the visual stimulus that is classified according to the classification result, and may gradually vary the shape of the visual feedback disposed on the classified visual stimulus into the first shape.

At every time point, the apparatus 100 may decrease the count value with respect to the visual stimulus that is not classified according to the classification result, and may gradually vary the shape of the visual feedback disposed on the non-classified visual stimulus into the second shape.

Accordingly, the apparatus 100 may gradually vary the shape of the visual feedback between the first shape and the second shape at every time point in response to the calculated count value.

Figure 4:
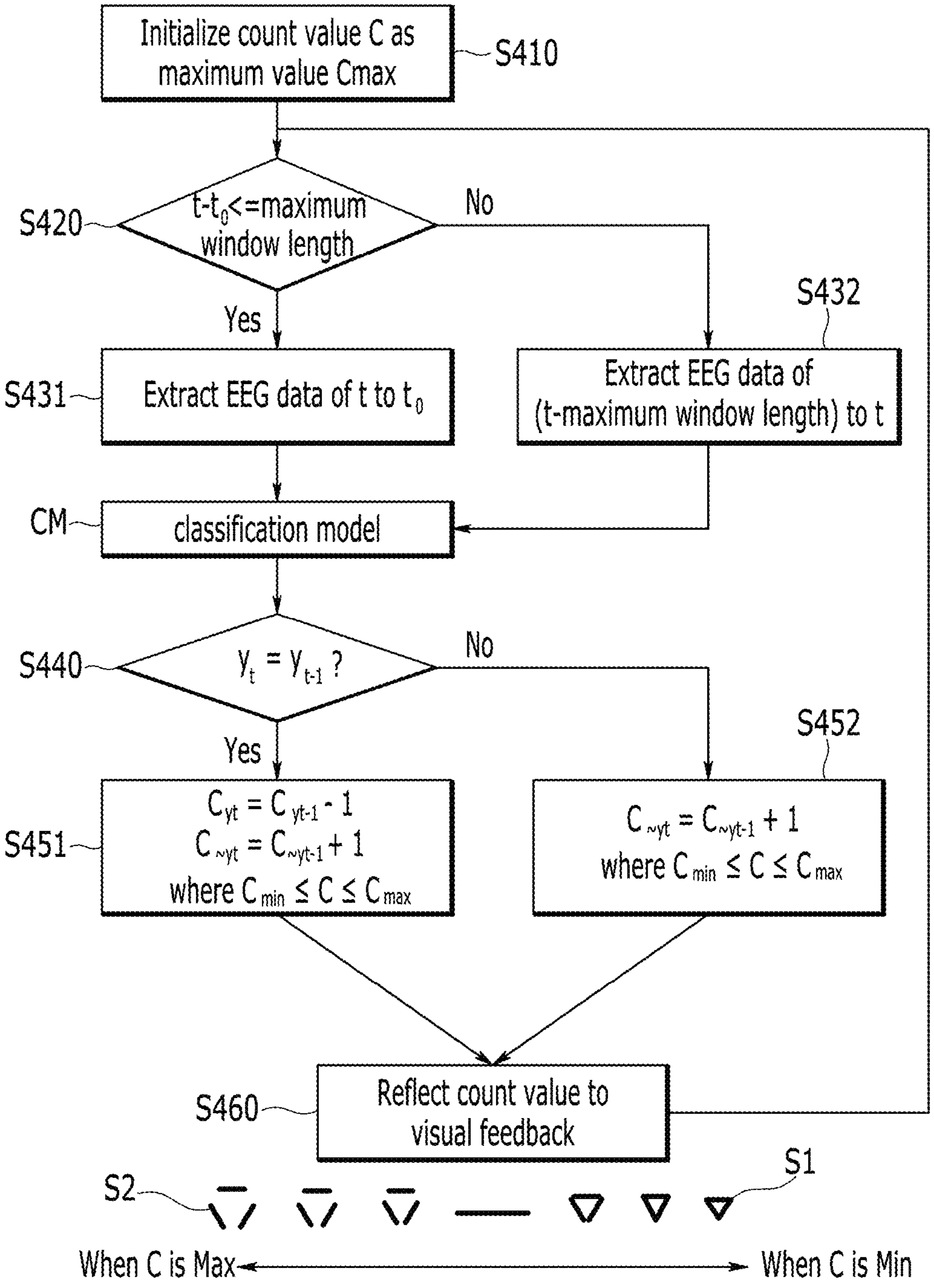
FIG. 4 is a flowchart of a method for presenting a visual feedback according to an embodiment.

FIG. 4 is a flowchart of a method for presenting the visual feedback according to an embodiment.

FIG. 4 is a flowchart more specifically showing the method for presenting the visual feedback according to an embodiment of FIG. 3. The method for presenting the visual feedback of FIG. 4 may be performed by the apparatus 100 for presenting a visual feedback.

Referring to FIG. 4, at a step or operation S410, at t0 when presenting of the visual stimulus starts, the apparatus 100 may initialize the count value C for each visual stimulus to be the maximum value Cmax. The maximum value Cmax and the minimum value Cmin may be arbitrarily set.

For example, the maximum value may be set as 11 and the minimum value Cmin may be set as 1. As the maximum value Cmax of the count value C increases, the speed at which the shape of the visual feedback gradually changes may be slower.

At a step or operation S420, the apparatus 100 may check whether a period from a time point to at which the visual stimulus first flickers to a current time point t exceeds a predetermined maximum window length. Here, the window may mean the length of data used for the analysis of the visual stimulus.

At a step or operation S431, when the period from the time point to at which the visual stimulus first flickers to the current time point t does not exceed the maximum window length, the apparatus 100 may extract EEG data and the classification result accumulated from the time point to of the first flicker to the current time point t, and may put them into the classification algorithm or a classification model CM as input data.

At a step or operation S432, when the period from the time point to of the first flicker to the current time point t exceeds the maximum window length, the apparatus 100 may extract the EEG data and the classification result as much as the maximum window length from the current time point t and may send them to the classification model CM.

For example, when the current time point t is 5 seconds and the maximum window length is set as 3 seconds, the apparatus 100 may only use data from 2 seconds to 5 seconds.

At a step or operation S440, the apparatus 100 may compare the classification result yt of the current time point derived through the classification model CM and the classification result y(t−1) of an immediately previous time point. The classification model CM may use the filter bank canonical correlation analysis (FBCCA) and/or other models used for the SSVEP classification.

At a step or operation S451, when the classification result yt of the current time point and the classification result y(t−1) of the immediately previous time point are the same, the apparatus 100 may subtract the specific value (e.g., 1) from the previous time point count C(y(t−1)) of the first visual stimulus classified as the target.

Accordingly, the apparatus 100 may determine the count value of the second time point as the value obtained by subtracting the specific value from the count value of the first time point, with respect to the same first visual stimulus classified by comparing the classification results of the first time point and the second time point that are contiguous.

Further, at the step or operation S451, the apparatus 100 may add the same specific value (e.g., 1) to the count C(−y(t−1)) of the second visual stimuli that are not classified as the target.

Accordingly, with respect to the second visual stimulus that is not classified, the apparatus 100 for presenting a visual feedback may determine the count value of the second time point as a value obtained by adding the specific value to the count value of the first time point.

In an example, the count value C cannot exceed the maximum value Cmax and cannot be smaller than the minimum value Cmin. Accordingly, when the count value C(yt) of the visual stimulus classified into the target is already 1, the value may be maintained afterwards.

At a step or operation S452, when the classification result yt of the current time point and the classification result y(t−1) of the immediately previous time point are different, the apparatus 100 may maintain the previous time point count C(y(t−1)) of the visual stimulus classified as the target, and may add the specific value 1 only to the count C(−y(t−1)) of the visual stimuli that is not classified as the target. This is to avoid misclassification due to floating values.

In other words, when the classification result of the first time point is the first visual stimulus and the classification result of the second time point is the second visual stimulus that is different from the first visual stimulus, with respect to the second visual stimulus, the apparatus 100 may maintain the count value of the second time point to be the same value as the count value of the first time point.

With respect to the first visual stimulus that is not classified at the second time point, the apparatus 100 may determine the count value of the second time point as a value obtained by adding the specific value to the count value of the first time point.

At a step or operation S460, the apparatus 100 may reflect the count value C on the visual feedback VF, for example illustrated in FIG. 2. The shape of the visual feedback VF may change in real time according to the count value C.

For example, when the count is the maximum value Cmax, the shape of the visual feedback may have a second shape S2 that is widely spread, and when it is classified into the target and the count value has continued to decrease to become the minimum value Cmin, the shape of the visual feedback may have a first shape S1 of a highly constricted triangle.

The apparatus 100 may gradually vary the shape of the visual feedback VF between the first shape S1 and the second shape S2 based on the count value C at every time point.

For example, the visual feedback VF may be varied based on the count value between the first shape S1 of a triangle in which three pieces are combined and the second shape S2 of a state in which three pieces are scattered.

As the size of the count value is reduced, the shape of the visual feedback VF may change in a direction closer to the first shape S1 than the second shape S2. For example, as the size of the count value is reduced, the three pieces scattered in the shape of the visual feedback VF may become closer to each other.

As the size of the count value increases, the shape of the visual feedback VF may change in a direction closer to the second shape S2 than the first shape S1. For example, as the size of the count value increases, the three pieces may become apart farther from each other.

The three pieces may be most apart when the count value is the maximum value, and the three pieces may be most close to each other to form a triangle when the count value is the minimum value.

The shape of the visual feedback shown in FIG. 4, as well as FIGS. 5 and 6 described below, is presented as a mere example, and the shape of the visual feedback is not limited to the shape shown in the drawing.

Figure 5:
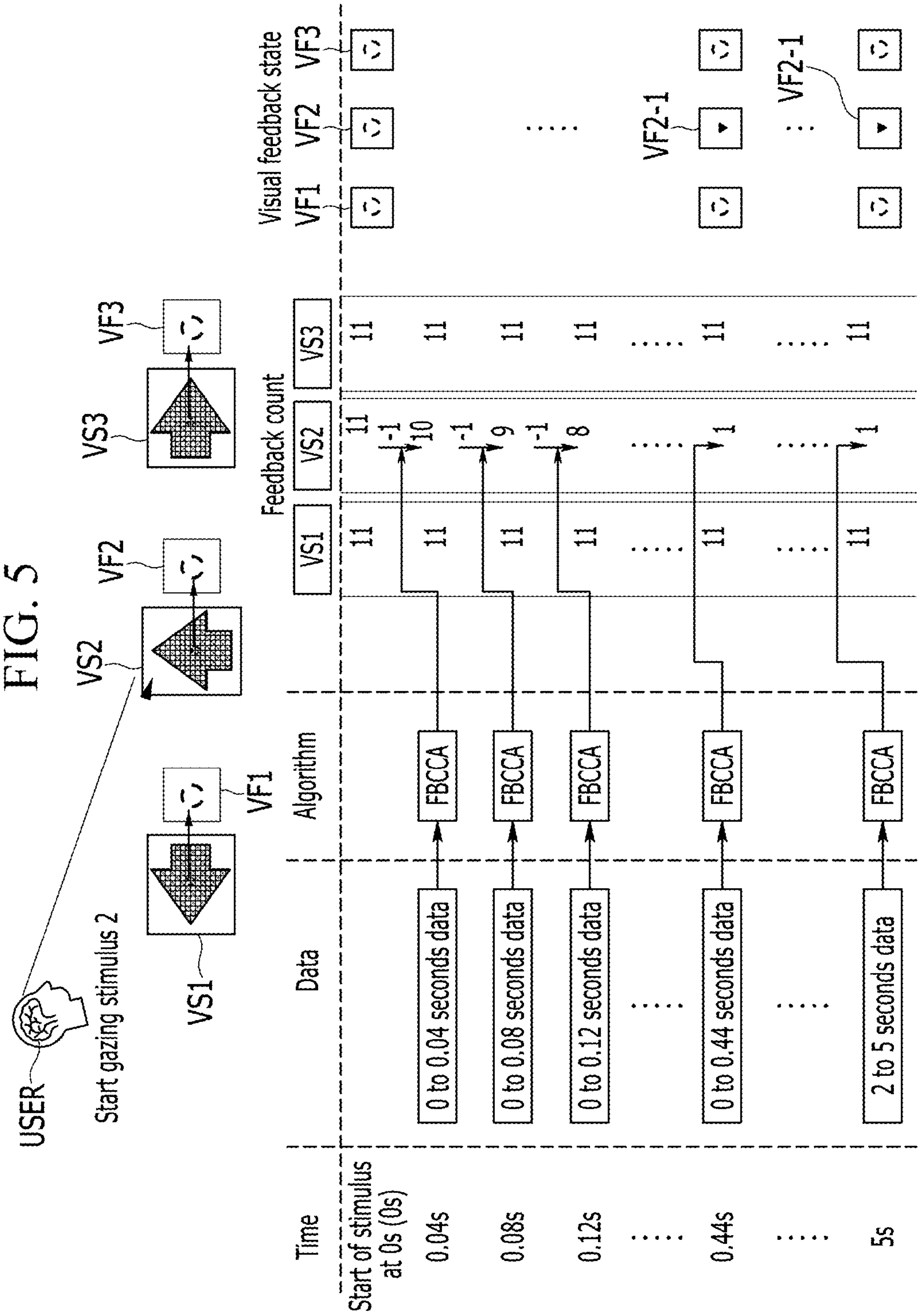
FIGS. 5 and 6 are drawings for explaining a method for presenting a visual feedback according to an embodiment.
Figure 6:
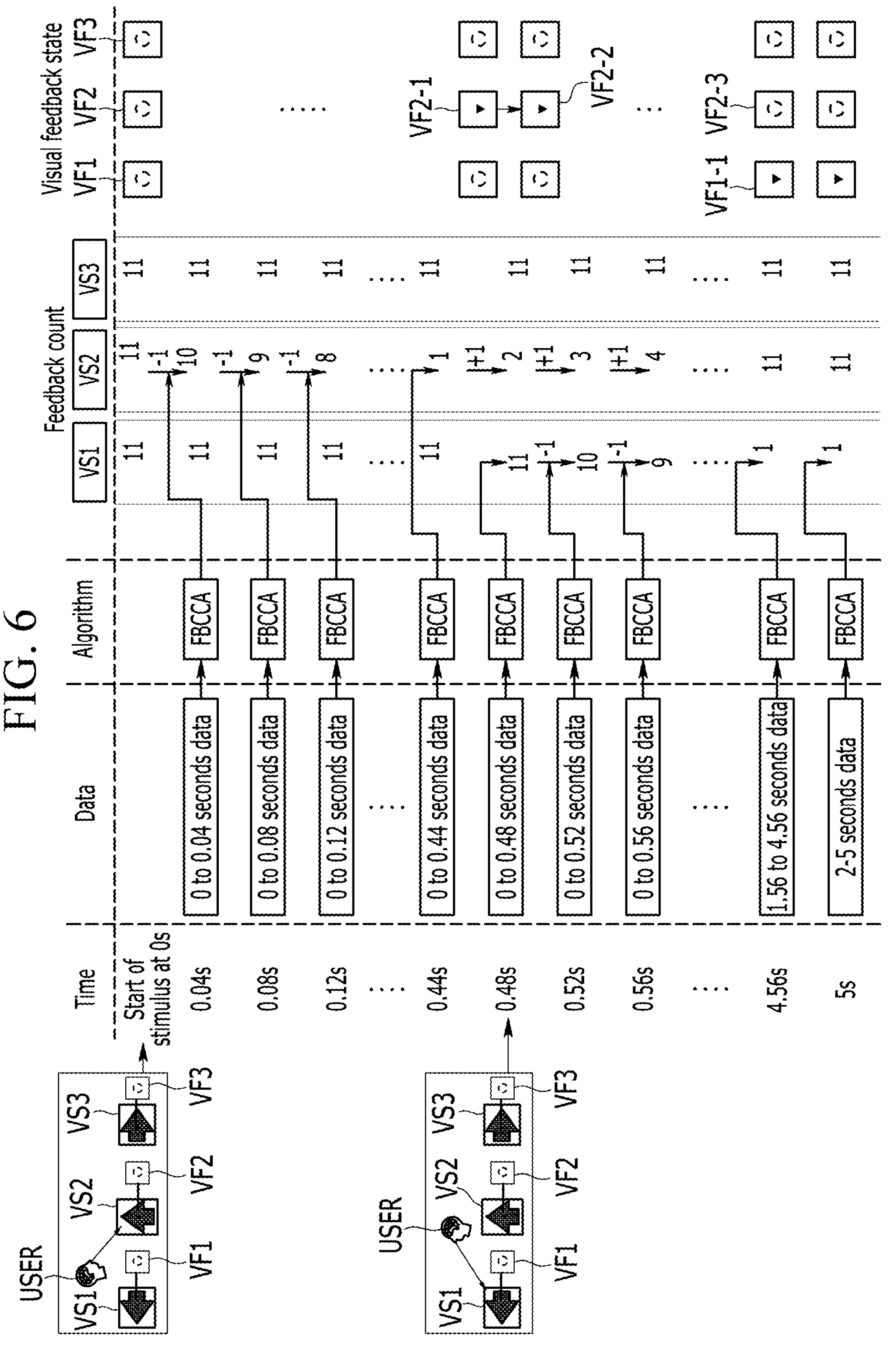

FIGS. 5 and 6 are drawings for explaining a method for presenting the visual feedback according to an embodiment. FIGS. 5 6 show examples of different scenarios in order to explain the method for presenting the visual feedback according to an embodiment of FIG. 4. Hereinafter, the description is made also with reference to FIG. 4.

FIG. 5 is a drawing for explaining a method for presenting the visual feedback according to a scenario in which the user is gazing at a second visual stimulus VS2 that flickers for 5 seconds.

In FIG. 5, a first visual stimulus VS1, the second visual stimulus VS2 and a third visual stimulus VS3 may flicker with different frequencies, respectively.

A first visual feedback VF1 may be disposed in the first visual stimulus VS1, a second visual feedback VF2 may be disposed in the second visual stimulus VS2, and a third visual feedback VF3 may be disposed in the third visual stimulus VS3.

The first visual stimulus VS1 and the first visual feedback VF1 may have the same frequency, the second visual stimulus VS2 and the second visual feedback VF2 may have the same frequency, and the third visual stimulus VS3 and the third visual feedback VF3 may have the same frequency.

When the first visual stimulus VS1, the second visual stimulus VS2, and the third visual stimulus VS3 are started at 0 s, the initialized count value C may be set as 11, which is the maximum value Cmax.

Afterwards, the apparatus 100 may receive the classification result with respect to first to third visual stimuli VS1, VS2, and VS3 by using the FBCC classification model based on the EEG data collected every 0.04 s.

The apparatus 100 may calculate the count values for each of first to third visual stimuli VS1, VS2, and VS3 based on the classification result.

In FIG. 5, since the user continues gazing at the second visual stimulus VS2 for 5 seconds, the classification result from a stimulus starting point 5 s to a current time point 5 s are all the same as the second visual stimulus VS2.

Therefore, the apparatus 100 may subtract 1 from the count value with respect to the second visual stimulus VS2, every 0.04 s.

When the previous classification result and the current classification result are compared at every 0.04 s and only when they are the same, the apparatus 100 may subtract 1 from the count value with respect to the classified visual stimulus.

For example, since the classification result of a time point 0.04 s and the classification result of a time point 0.08 s are the same as the second visual stimulus VS2, the count value of the second visual stimulus VS2 at the time point 0.08 s may be determined as the value obtained by subtracting 1 from the count value of the time point 0.04 s.

However, since there is not classification result at an initial time point 0 s at which the visual stimulus is presented, at the time point 0.04 s, the value 1 may be subtracted from an initial count value of 11 with respect to the second visual stimulus VS2 classified at the corresponding time point.

When the previous classification result and the current classification result are compared every 0.04 s and they are the same, the apparatus 100 for presenting a visual feedback may add 1 to the count value with respect to the visual stimulus that is not classified.

However, since the count value cannot exceed the maximum value, the first visual stimulus VS1 and the third visual stimulus VS3 that have been initially set as the maximum value are not added with 1.

Therefore, with respect to the first visual stimulus VS1 and the third visual stimulus VS3 that are not classified, the initial count value of 11 may be maintained until the time point 5 s.

In addition, since the count value cannot decrease below the minimum value, when the count value with respect to the second visual stimulus reaches the minimum value, the minimum value may be maintained afterwards.

When gazing of the user at the second visual stimulus VS2 continues from the time point 0.04 s to a time point 0.44 s, the apparatus 100 for presenting a visual feedback may subtracts 1 from the count value with respect to the second visual stimulus VS2 at every time point.

In FIG. 5, the count value with respect to the second visual stimulus VS2 at the time point 0.44 s may reach 1, which is the minimum value.

When the gazing of the user to the second visual stimulus VS2 is maintained from the time point 0.44 s to 5 s, the apparatus 100 may maintain the count value of the second visual stimulus VS2 as 1 after the time point 0.44 s until 5 s.

The apparatus 100 may predefine the maximum window length.

For example, the apparatus 100 may predefine the maximum window length as 3 seconds. When the maximum window length is 3 seconds, the apparatus 100 may only use the EEG data from the time point 2 s to the time point 5 s, and may not use the EEG data from the time point 0 s to a time point 1.96 s.

Accordingly, the apparatus 100 may reflect the classification result of the visual stimulus according to the EEG data from the time point 2 s to the time point 5 s on the visual feedback.

The apparatus 100 may reflect the count value calculated with respect to the visual stimulus to the visual feedback in real time. The visual feedback may vary the shape based on the count value.

The shape of the first visual feedback VF1 disposed in the first visual stimulus VS1 may have the same shape from the time point 0 s, at which the visual stimulus is presented, to the time point 5 s. That is, since the count value with respect to the first visual stimulus VS1 that is not classified maintains the initial value of 11, the shape of the first visual feedback VF1 may maintain the second shape S2, for example as illustrated in FIG. 4.

Even in the case of the third visual feedback VF3 of the third visual stimulus VS3, since the count value maintains the initial maximum value of 11 until the current time point 5 s, a shape of the third visual feedback VF3 may maintain the second shape S2.

The shape of the second visual feedback VF2 disposed in the second visual stimulus VS2 classified according to the classification result of 5 seconds may change based on the count value. As the count value decreases from the maximum value of 11, the shape of the second visual feedback VF2 may change from the second shape S2 to the first shape S1.

Accordingly, the second visual feedback VF2 of the initial time point 0 s may have the second shape S2 according to the maximum count value of 11, and the second visual feedback VF2-1 of the time point 0.44 s may have the first shape S1 according to the count value of the minimum value.

The second visual feedback VF2-1 after the time point 0.44 s to the time point 5 s may maintain the first shape S1 by reflecting the maintained count value.

FIG. 6 is a drawing for explaining a method for presenting the visual feedback according to a scenario in which the user gazing at the second visual stimulus VS2 changes to gaze at the first visual stimulus VS1 within 5 seconds.

In FIG. 6, while gazing at the second visual stimulus VS2 at the initial time point 0 s, the user may start gazing at the first visual stimulus VS1 at a time point 0.48 s and continue gazing at the first visual stimulus VS1 until the time point 5 s.

The classification result from the initial time point 0 s to the time point 0.44 s may be the same as the second visual stimulus VS2. Therefore, the count value with respect to the second visual stimulus VS2 may decrease by 1 at every time point. The count value with respect to the second visual stimulus VS2 at the time point 0.44 s may have the minimum value 1.

Therefore, the second visual feedback VF2-1 of the time point 0.44 s may have the first shape S1.

The classification result of the time point 0.48 s is the first visual stimulus VS1, which is different from the second visual stimulus VS2, which is the classification result of the time point 0.44 s that is the previous time point.

Therefore, the apparatus 100 may determine the count value with respect to the second visual stimulus VS2 of the time point 0.48 s as 2, by adding 1 to 1, which is the count value of the second visual stimulus VS2 of the time point 0.44 s.

In addition, the apparatus 100 may maintain 11, which is the count value of the first visual stimulus VS1 of the time point 0.44 s, and may determine the count value of the first visual stimulus VS1 of the time point 0.48 s as 11.

Although the classification result is the first visual stimulus VS1 at the time point 0.48 s, it is not immediately subtracted by 1, for the stability of the classification result. In order to prevent misclassification due to fluctuating value, the apparatus 100 for presenting a visual feedback may immediately compare it with the previous classification result, and subtracts 1 only when the classification results are the same.

For example, the classification result of 0.44 s, which is the time point that is immediately previous of the time point 0.48 s is the second visual stimulus VS2, and the apparatus 100 may not subtract 1 from the count value with respect to the first visual stimulus VS1 at the time point 0.48 s.

Thereafter, when the user continues to gaze at the first visual stimulus VS1 from 0.52 s to 5 s, the apparatus 100 continues to subtract 1 from the count value with respect to the first visual stimulus VS1 at every time point until the minimum value is reached. The apparatus 100 may continue to add 1 to the count value with respect to the second visual stimulus VS2 at every time point until the maximum value is reached.

With respect to the third visual stimulus VS3 that is not classified from the initial time point 0 s to the current time point 5 s, the maximum count value of 11, which is the initial value, may be maintained.

The apparatus 100 may reflect the count values of first to third visual stimuli VS1, VS2, and VS3 to first to the third visual feedbacks VF1, VF2, and VF3, respectively.

In FIG. 6, the first visual feedback VF1 at the initial time point and until the time point 0.48 s may have the same second shape S2.

The first visual feedback VF1-1 of the time point 5 s that is the current time point may have the first shape S1. The shape of the first visual feedback VF1 may gradually vary at every time point from the time point 0.48 s. Until the count value with respect to the first visual stimulus VS1 reaches the minimum value, the shape of the first visual feedback VF1 may vary.

The second visual feedback VF2-3 of the time point 5 s that is the current time point may have the second shape S2. The shape of the second visual feedback VF2 may have the second shape S2 at the initial time point 0 s, and may gradually vary to the first shape S1 until the time point 0.44 s.

Thereafter, the shape of the second visual feedback VF2-2 of the time point 0.48 s may have a shape closer to the second shape S2 than the first shape S1 of the second visual feedback VF2-1 of the time point 0.44 s.

From the time point 0.48 s, the shape of the second visual feedback VF2 may vary at every time point until the count value reaches the maximum value.

The shape of the third visual feedback VF3 may maintain the second shape S2 from the initial time point 0 s to the current time point 5 s.

Figure 7:
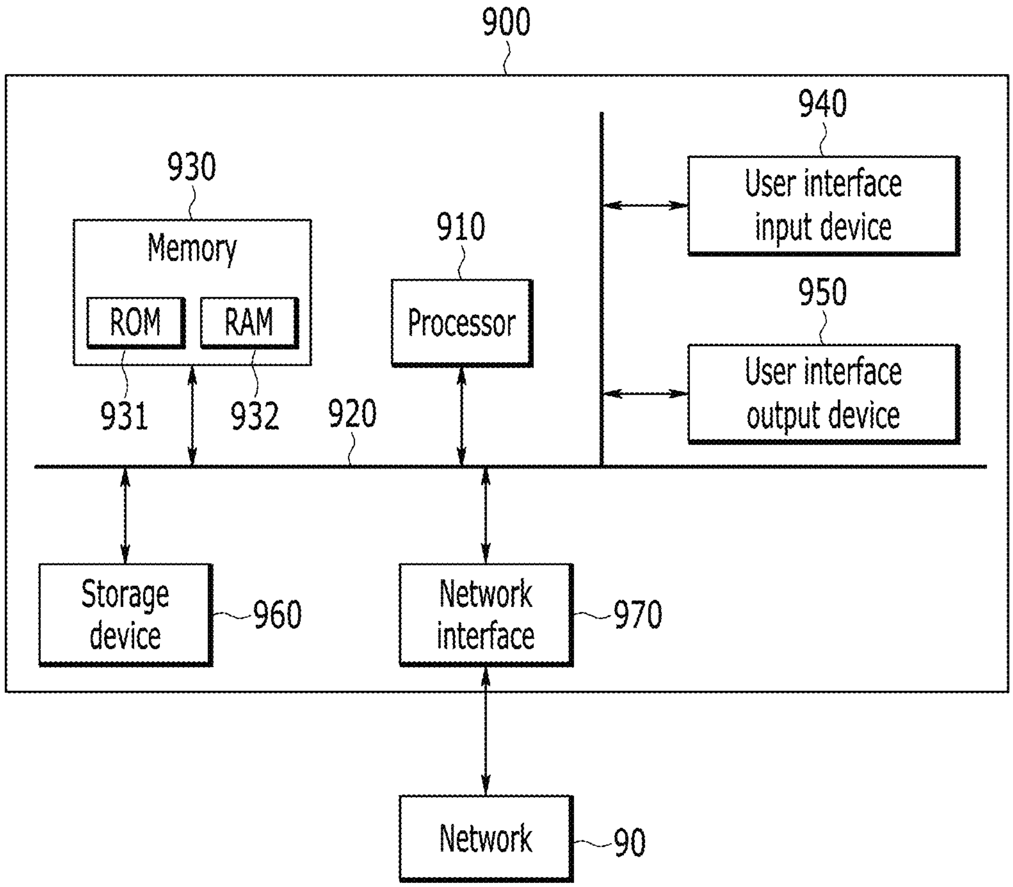
FIG. 7 is a drawing for explaining a computing device according to an embodiment.

FIG. 7 is a drawing for explaining a computing device according to an embodiment.

Referring to FIG. 7, a method and apparatus for presenting the visual feedback according to an embodiment may be implemented by using a computing device 900.

The computing device 900 may include at least one of a processor 910, a memory 930, a user interface input device 940, a user interface output device 950 and a storage device 960 that communicate through a bus 920. The computing device 900 may also include a network interface 970 electrically connected to a network 90. The network interface 970 may transmit or receive signals with other entities through the network 90.

The processor 910 may be implemented in various types such as a micro controller unit (MCU), an application processor (AP), a central processing unit (CPU), a graphic processing unit (GPU), a neural processing unit (NPU), and the like, and may be any type of semiconductor device capable of executing instructions stored in the memory 930 or the storage device 960. The processor 910 may be configured to implement the functions and methods described above with respect to FIGS. 1-6.

The memory 930 and the storage device 960 may include various types of volatile or non-volatile storage media. For example, the memory may include read-only memory (ROM) 931 and a random-access memory (RAM) 932. In this embodiment, the memory 930 may be located inside or outside processor 910, and the memory 930 may be connected to the processor 910 through various known means.

In some embodiments, at least some configurations or functions of the apparatus and method for presenting a visual feedback according to an embodiment may be implemented as a program or software executable by the computing device 900, and program or software may be stored in a computer-readable medium.

In some embodiments, at least some configurations or functions of the apparatus and method for presenting a visual feedback according to an embodiment may be implemented by using hardware or circuitry of the computing device 900, or may also be implemented as separate hardware or circuitry that may be electrically connected to the computing device 900.

While this disclosure has been described in connection with what is presently considered to be practical embodiments, it should be understood that the disclosure is not limited to the disclosed embodiments, but, on the contrary, is intended to cover various modifications and equivalent arrangements included within the spirit and scope of the appended claims.

DESCRIPTION OF SYMBOLS

100: apparatus for presenting the visual feedback
110: signal receiver
120: signal processor
130: visual feedback reflector
VS: visual stimulus
VF: visual feedback

What is claimed is:

1. A method for presenting visual feedback, the method comprising:
- receiving a steady-state visual evoked potential (SSVEP) signal extracted through an electroencephalogram (EEG) analysis of a user gazing at a visual stimulus of a specific frequency;
- classifying the visual stimulus to generate a classification result based on the SSVEP signal;
- disposing, on the visual stimulus, a visual feedback having a same frequency as the visual stimulus; and
- reflecting the classification result in the visual feedback in real time,
- wherein reflecting the classification result in the visual feedback in real time includes:
  - periodically collecting the classification result at preset time points within a maximum window length,
  - calculating a count value with respect to the visual stimulus based on the classification result collected at each time point among the preset time points, and
  - varying a shape of the visual feedback in real time based on the count value.

2. The method of claim 1, wherein reflecting the classification result in the visual feedback in real time includes:
- varying a shape of a first visual feedback disposed in a first visual stimulus classified from among a plurality of visual stimuli in each of which the visual feedback is disposed according to the classification result to a first shape; and
- varying a shape of a second visual feedback disposed in a second visual stimulus that is not classified to a second shape.

3. The method of claim 1, wherein collecting the classification result includes, when a length from a time point at which the visual stimulus first flickers to a current time point is greater than the maximum window length, collecting the classification result as much as the maximum window length based on the current time point.

4. The method of claim 1, wherein:
- the count value has a maximum value and a minimum value; and
- calculating the count value with respect to the visual stimulus includes setting the count value of an initial time point at which the visual stimulus is presented as an arbitrary the maximum value.

5. The method of claim 4, wherein calculating the count value with respect to the visual stimulus further includes, when presenting of the visual stimulus is started, initializing the count value of the visual stimulus at the initial time point as the maximum value.

6. The method of claim 1, wherein calculating the count value with respect to the visual stimulus includes:
- when the classification results of a first time point and a second time point that are contiguous are compared and found to be the same as a first visual stimulus,
- determining the count value of the second time point as a value obtained by subtracting a specific value from the count value of the first time point, with respect to a first visual stimulus that is classified, and
- determining the count value of the second time point as a value obtained by adding the specific value to the count value of the first time point, with respect to a second visual stimulus that is not classified.

7. The method of claim 6, wherein calculating the count value with respect to the visual stimulus further includes:
- when the first visual stimulus is classified at the first time point, and the second visual stimulus is classified at the second time point,
- maintaining the count value of the second time point to be the same value as the count value of the first time point, with respect to the second visual stimulus, and
- determining the count value of the second time point as a value obtained by adding the specific value to the count value of the first time point, with respect to the first visual stimulus.

8. The method of claim 7, wherein:
- the value obtained by adding the specific value to the count value is smaller than or equal to a maximum value of the count value; and
- the value obtained by subtracting the specific value from the count value is greater than or equal to a minimum value of the count value.

9. The method of claim 4, wherein:
- the shape of the visual feedback has a first shape when the count value is the maximum value, and has a second shape when the count value is the minimum value; and
- varying the shape of the visual feedback in real time includes gradually varying the shape of the visual feedback between the first shape and the second shape at each time point, among the preset time points, in response to the count value.

10. An apparatus for presenting visual feedback, the apparatus comprising:
- a signal receiver configured to receive a steady-state visual evoked potential (SSVEP) signal extracted through an electroencephalogram (EEG) analysis of a user gazing at a visual stimulus of a specific frequency;
- a signal processor configured to classify the visual stimulus and generate a classification result based on a SSVEP signal; and
- a visual feedback reflector configured to
- dispose, on the visual stimulus, a visual feedback having a same frequency as the visual stimulus, and
- reflect the classification result in the visual feedback in real time,
- wherein the visual feedback reflector is configured to:
  - periodically collect the classification result at preset time points within a maximum window length;
  - calculate a count value with respect to the visual stimulus based on the classification result collected at each time point among the preset time points; and
  - vary a shape of the visual feedback in real time based on the count value.

11. The apparatus of claim 10, wherein the visual feedback reflector is configured to:

vary a shape of a first visual feedback disposed in a first visual stimulus classified from among a plurality of visual stimuli in each of which the visual feedback is disposed according to the classification result to a first shape; and vary a shape of a second visual feedback disposed in a second visual stimulus that is not classified to a second shape.

12. The apparatus of claim 10, wherein the visual feedback reflector is configured to, when a length from a time point at which the visual stimulus first flickers to a current time point is greater than the maximum window length, collect the classification result as much as the maximum window length based on the current time point.

13. The apparatus of claim 10, wherein:

the count value has a maximum value and a minimum value; and the visual feedback reflector is configured to set the count value of an initial time point at which the visual stimulus is presented as an arbitrary the maximum value.

14. The apparatus of claim 13, wherein the visual feedback reflector is configured to, when presenting of the visual stimulus is started, initialize the count value of the visual stimulus at the initial time point as the maximum value.

15. The apparatus of claim 10, wherein the visual feedback reflector is configured to:

when the classification results of a first time point and a second time point that are contiguous are compared and found to be the same as a first visual stimulus, determine the count value of the second time point as a value obtained by subtracting a specific value from the count value of the first time point, with respect to a first visual stimulus that is classified, and determine the count value of the second time point as a value obtained by adding the specific value to the count value of the first time point, with respect to a second visual stimulus that is not classified.

16. The apparatus of claim 15, wherein the visual feedback reflector is configured to when the classification result of the first time point is the first visual stimulus and the classification result of the second time point is the second visual stimulus, providing a difference, maintain the count value of the second time point to be the same value as the count value of the first time point, with respect to the second visual stimulus, and determine the count value of the second time point as the value obtained by adding the specific value to the count value of the first time point, with respect to the first visual stimulus.

17. The apparatus of claim 16, wherein:

the value obtained by adding the specific value to the count value is smaller than or equal to a maximum value of the count value; and the value obtained by subtracting the specific value from the count value is greater than or equal to a minimum value of the count value.

18. The apparatus of claim 13, wherein:

the shape of the visual feedback has a first shape when the count value is the maximum value, and has a second shape when it is the minimum value; and the visual feedback reflector is configured to gradually vary the shape of the visual feedback between the first shape and the second shape at each time point, among the preset time points, in response to the count value.

* * * * *